United States Patent [19]

Mueller et al.

[11] Patent Number: 4,802,998
[45] Date of Patent: Feb. 7, 1989

[54] POWDER-FORM LUBRICANT ADDITIVES FOR WATER-BASED DRILLING FLUIDS

[75] Inventors: Heinz Mueller, Wuppertal; Claus-Peter Herold, Mettmann, both of Fed. Rep. of Germany

[73] Assignee: Henkel Kommanditgesellschaft auf Aktien, Duesseldorf, Fed. Rep. of Germany

[21] Appl. No.: 70,858

[22] Filed: Jul. 8, 1987

[30] Foreign Application Priority Data

Jul. 8, 1986 [DE] Fed. Rep. of Germany ....... 3622826

[51] Int. Cl.$^4$ .............................................. C09K 7/02
[52] U.S. Cl. ................... 252/8.514; 252/8.51; 252/49.3
[58] Field of Search ............... 252/8.51, 8.514, 49.3, 252/8.513

[56] References Cited

U.S. PATENT DOCUMENTS

| | | | |
|---|---|---|---|
| 2,862,881 | 12/1958 | Reddie | 252/8.515 |
| 3,027,324 | 3/1962 | Rosenberg | 252/8.51 X |
| 3,047,493 | 7/1962 | Rosenberg | 252/8.51 |
| 3,047,494 | 7/1962 | Browning | 252/8.51 |
| 3,480,544 | 11/1969 | Hilty | 252/8.51 X |
| 3,761,410 | 9/1973 | Monoshine et al. | 252/8.51 |
| 3,810,836 | 5/1974 | Norton | 252/8.5 C |
| 3,840,460 | 10/1974 | Sheldahl et al. | 252/8.5 C |
| 4,064,055 | 12/1977 | Carney | 252/8.5 C |
| 4,212,794 | 7/1980 | Grodde et al. | 260/97.6 |
| 4,356,096 | 10/1982 | Cowan et al. | 252/8.51 |
| 4,409,108 | 10/1983 | Carney et al. | 252/8.51 X |

FOREIGN PATENT DOCUMENTS 578341 6/1959 Canada ............................. 252/8.515

Primary Examiner—Herbert B. Guynn
Attorney, Agent, or Firm—Ernest G. Szoke; Wayne C. Jaeschke; Henry E. Millson, Jr.

[57] ABSTRACT

Powder-form lubricant additives for water-based drilling fluids which contain from 95 to 30% by weight, based on the total weight of the powder, of highly disperse silicas, from 5 to 70% by weight, based on the total weight of the powder, of one or more fatty acid alkyl esters corresponding to the following general formula.

$$R^1COOR^2 \qquad (I)$$

in which $R^1$ is a straight-chain or branched, saturated or mono- or polyunsaturated $C_9$–$C_{21}$ alkyl or alkenyl radical and $R^2$ is a straight-chain or branched $C_1$–$C_{12}$ alkyl radical, and/or polyesters obtainable by reaction of di-, oligo- or poly-hydroxy compounds with carboxylic acids and/or distillation residues from the transesterification of native fatty acid esters and, optionally, other additives known for lubricating purposes in quantities of from 0 to 20% by weight, based on the total weight of the powder, and to the use of these powder-form additives in drilling fluids for oil well and mine drilling in quantities of from 0.01 to 5% by weight, based on the total weight of the drilling fluid.

13 Claims, No Drawings

POWDER-FORM LUBRICANT ADDITIVES FOR WATER-BASED DRILLING FLUIDS

BACKGROUND OF THE INVENTION

1. Field of the Invention

This invention relates to powder-form lubricant additives and to their use for water-based drilling fluids in the oil and mine drilling field.

2. Statement of Related Art

In the sinking of wells, particularly in the oil drilling field, the drilling fluids used nowadays have to satisfy stringent requirements. The drilling fluids, which for reasons of cost normally contain water as their main constituent, have to perform several functions at the same time, their overall quality being judged by whether they are capable of meeting an optimum of all requirements.

One of the most important functions of a drilling fluid is the removal of the so-called "rock cuttings" released by the bit, i.e. carrying the solid material detached to the surface. Drilling fluids having too low a viscosity are unable to remove the rock cuttings. Another, albeit not the most important requirement is the cooling and lubrication of the drill bit and drill pipe. However, this particular requirement is becoming increasingly important, particularly in the case of relatively deep walls, insofar as the drill pipe cannot always be guided "straight" due to the geological formations, instead so-called "crooked bores" are formed where the drill pipe comes into mechanical contact with the rock formation and wears relatively quickly at the high rotational speeds normally involved. Good lubrication by a suitable drilling fluid increases the life of the drill bit and the drill pipe. Economic advantages can be obtained not only by reducing wear, but also by eliminating the need to replace the drill bit and/or the drill pipe.

Drilling fluids differing widely in their composition have been used to satisfy the above-mentioned requirements. Thus, it was for some time standard practice to add mineral oil as a lubricating additive to drilling fluids in quantities of from 5 to 10% by weight. As a result, serious ground water pollution occurred so that mineral oils are no longer permitted as lubricating additives to drilling fluids. In addition, it has been proposed to use a tiglyceride/alcohol mixture to reduce torque in drilling fluids. However, this mixture does not have the desired lubricating effect and, in addition, causes troublesome foaming of the drilling fluid.

In addition, tall oil has been widely used in drilling fluids. It serves as an emulsifier in emulsion-type drilling fluids whether of the oil-in-water type or of the water-in-oil type. For example, U.S. Pat. No. 4,212,794 describes the use of a tall oil fraction of high resinic acid content as lubricant for aqueous drilling fluids, this tall oil fraction being said to have a fatty acid or oil content of at most 20%. Although it was possible in this way to achieve improved biological degradability and clearly to reduce the hitherto known troublesome foaming, these lubricants were unsatisfactory in their lubricating properties where highspeed drill bits were used and did not meet the demands made of them.

U.S. Pat. No. 3,810,836, U.S. Pat. No. 3,840,460 and U.S. Pat. No. 4,064,055 describe liquid drilling fluid additives consisting essentially of paraffins oils and sulfurized oils and of high molecular weight fatty acid esters as emulsifiers. U.S. Pat. No. 4,064,055 discloses an alkyl ester of an oxazolidine derivative as a further additive. Although such additives were satisfactory in regard to their cooling and lubricating properties for the drill bit and the drill pipe, they are attended by the serious disadvantage that they solidify at low temperatures due to their relatively high pour point and, as a result, are very difficult to dose and are equally difficult to introduce into the actual drilling fluid at low temperatures. This results in unwanted overdosage which involves economic disadvantages.

DESCRIPTION OF THE INVENTION

An object of the present invention is to provide lubricant additives for water-based drilling fluids, particularly for use in the oil drilling and mine drilling fields, which are easy to handle, even in extreme temperatures, i.e. may readily be added in measured quantities at any time and homogeneously distributed in the drilling fluid. The invention seeks to guarantee this ease of handling in the temperature range of from $-40°$ to $+80°$ C. In addition, the additive is intended to provide an improvement in the lubrication of the drill bit and drill pipe at temperatures in this range so that there is no long-term metal abrasion in the event of mechanical contact between the wall of the well and the metal parts. In addition, the rheological properties of the drilling fluid are intended to remain unaffected, so that satisfactory removal of the rock cuttings continues to be guaranteed. In addition, the additive is intended not to affect the biological degradability of the drilling fluid used.

It has now surprisingly been found that a new lubricant additive blended in powder form for the use in water-based drilling fluids satisfies all of the above requirements.

Other than in the operating examples or where otherwise indicated, all numbers expressing quantities of ingredients or reaction conditions used herein are to be understood as modified in all instances by the term "about".

The invention relates to powder-form lubricant additives for water-based drilling fluids, that contain from 95 to 30% by weight, based on the total weight of the powder, of highly disperse silicas, from 5 to 70% by weight, based on the total weight of the powder, of one or more fatty acid alkyl esters corresponding to the following general formula $$R^1COOR^2 \qquad (I)$$

in which
- $R^1$ represents a straight-chain or branched, saturated or mono- or polyunsaturated $C_9$–$C_{21}$ alkyl or alkenyl radical and
- $R^2$ represents a straight-chain or branched $C_1$–$C_{18}$ alkyl radical, and/or polyol esters obtainable by reaction of di-, oligo- or polyhydroxy compounds with carboxylic acids and/or distillation residues from the transesterification of native fatty acid esters and, optionally, other additives known for lubricating purposes in quantities of from 0 to 20% by weight, e.g. from 1 to 20% by weight, based on the total weight of the powder.

The invention also relates to the use of the powder-form additives of the invention in drilling fluids for oil drilling and mine drilling in quantities of from 0.01 to 5% by weight, based on the total weight of the drilling fluid.

In the following description and in the Examples, all percentages are percentages by weight, unless otherwise specifically stated.

The powder-form lubricant additives according to the invention for water-based drilling fluids contain as one constituent highly disperse silicas in quantities of from 95 to 30% by weight and preferably in quantities of from 60 to 40% by weight, based on the total weight of the additive powder. Such highly disperse silicas are known from the prior art and are understood to be, for example, precipitated silicas obtained by the wet chemical route from alkali metal silicate solutions by reaction with mineral acids. Other highly disperse silicas are pyrogenic silicas and pyrogenic hydrophobicized silicas. Pyrogenic silicas and pyrogenic hydrophobicized silicas are generally understood to be highly disperse silicas obtained by coagulation from the gas phase at high temperatures. This is normally effected by flame or high-temperature pyrolysis. However, highly disperse silicas prepared by other methods are also suitable for the high-pressure lubricants according to the invention.

The highly disperse silicas suitable for use in accordance with the invention are described, for example, in "Ullmanns Enzyklopadie der technischen Chemie", Vol. 21, page 463. The particles thus have a diameter of an average from 5 to 50 nm and a surface of from 50 to 300 m²/g.

The powder-form lubricant additives according to the invention for water-based drilling fluids contain as a further constituent from 5 to 70% by weight and preferably from 40 to 60% by weight of one or more fatty acid alkyl esters corresponding to the following general formula $$R^1COOR^2 \qquad (I)$$

in which $R^1$ is a straight-chain or branched, saturated or mono- or polyunsaturated alkyl or alkenyl radical containing from 9 to 21 carbon atoms. Accordingly, $R^1$ may represent nonyl, decyl, undecyl, dodecyl, tridecyl, tetradecyl, pentadecyl, hexadecyl, heptadecyl, octadecyl, nonadecyl, eicosyl or uneicosyl straight-chain radicals or branched isomers thereof. Instead of the saturated alkyl radicals, $R^1$ can also be mono- or polyunsaturated alkenyl radicals. Preferred radicals for $R^1$ are straight-chain or branched, saturated or mono- or polyunsaturated alkyl or alkenyl radicals containing from 11 to 17 carbon atoms. Fatty acid esters of fatty acids obtainable from natural sources may be used with particular advantage, i.e. for example by virtue of their ready, inexpensive availability. Suitable fatty acid esters of this type are, for example, fatty acid esters containing alkyl radicals $R^1$ of the cocosalkyl or tallow alkyl type. Fatty acid esters such as these ($R^1$) are generally not pure substances, but mixtures of substances from a more or less wide range, of which the size is dependent upon the particular source of the fat or oil used as adduct.

In general formula (I) above, the substituent $R^2$ is a straight-chain or branched alkyl radical containing from 1 to 18 carbon atoms. Accordingly, $R^2$ may represent straight-chain radicals from the group comprising methyl, ethyl, propyl, butyl, pentyl, hexyl, heptyl, octyl, nonyl, decyl, undecyl, dodecyl, tridecyl, tetradecyl, pentadecyl, hexadecyl, heptadecyl or octadecyl. Branched alkyl radicals $R^2$ from the above-mentioned group may also be used with equal effect. Preferred are fatty acid esters (I), in which $R^2$ is a straight-chain or branched $C_1$–$C_8$ alkyl radical, preferably a methyl, ethyl, n-propyl or i-propyl radical.

Polyol esters obtainable by reaction of di-, oligo- or polyhydroxy compounds with carboxylic acids are also suitable as the ester component of the powder-form lubricant additives according to the invention either together with or instead of fatty acid alkyl esters corresponding to general formula (I). In one preferred embodiment of the invention, the ester component used is selected from polyol esters obtainable by reaction of one or more polyfunctional hydroxy compounds from the group comprising ethylene glycol, propylene glycol, glycerol, trimethylolethane, trimethylolpropane, pentaereythritol, sorbitol, polyols obtainable by autocondensation of glycerol with elimination of water and reaction products of the above hydroxy compounds with ethylene oxide and/or propylene oxide, with one or more carboxylic acids corresponding to the following general formula $$RCOOH \qquad (II)$$

in which R is a straight-chain or branched, saturated or mono- or polyunsaturated alkyl or alkenyl radical containing from 5 to 21 carbon atoms. The polyol esters obtainable from the above hydroxy compounds and carboxylic acids can be used as ester component in the powder-form additives according to the invention either individually or in admixture in any ratio with one another or with the fatty acid alkyl ester components corresponding to general formula (I) above. The polyol esters of polyfunctional hydroxy compound and carboxylic acid suitable for use in accordance with the invention are prepared in known manner, for example by standard transesterification reactions at elevated temperatures with entrainment of the water of reaction formed in the condensation reaction. The preparation of the polyol esters useable in accordance with the invention is described in the prior art and is not the subject of the present invention.

Instead of or in conjunction with the above-mentioned fatty acid alkyl esters of general formula (I) and/or polyol esters, distillation residues from the transesterification of naturally-occurring fatty acid esters can also be used as the fatty acid alkyl ester component of the powder-form lubricant additives according to the invention for water-based drilling fluids. In the context of the present invention, distillation residues such as these are understood to be the distillation residues which are separated off in the distillation of crude fatty acid alkyl esters which are formed as crude products after the transesterification of naturally occurring oils or fats or after the splitting of naturally occurring oils or fats and subsequent esterification of the fatty acids formed. Fatty acid alkyl ester distillation residues of this type generally consist of higher fatty acid alkyl esters or mixtures thereof which are difficult to distill and which may be used together with or instead of fatty acid alkyl esters corresponding to general formula (I) above in a relative ratio by weight of from 0:100 to 100:0 parts by weight.

In addition to the components mentioned above, i.e. silicas and fatty acid alkyl esters or polyol esters or mixtures thereof, the powder form lubricant additives according to the invention for water-based drilling fluids may optionally contain other additives known per se for lubricating purposes which are normally used in quantities of from 0 to 20% by weight, based on the total weight of the powder. Optional additives of this type are, for example, metal soaps, sulfurized fatty acids and derivatives thereof and blown oils which may be used either individually or in admixture in any ratio with one another. Suitable metal soaps are, in particular, aluminium stearate, calcium stearate and magnesium stearate. Sulfurized fatty acids and derivatives thereof may be added either instead of or in conjunction with the metal soaps. Additives such as these are generally known as "EP additives" and comprise organic compounds containing polysulfide bridges, predominantly sulfurized oils of natural origin, such as for example sulfurized rape oil, sulfurized cottonseed oil, sulfurized soya oil etc., or sulfurized alkyl esters of natural fatty acids, of the type generally used as high-pressure lubricating additives. However, so-called "blown" oils may also be used instead of the above optional components. Blown oils are normally understood to be oils and fats of natural origin through which air or oxygen-containing gas mixtures have been blown at elevated temperature.

The powder-form lubricant additives of the invention for water-based drilling fluids are prepared by mixing the individual components with one another in the desired quantitative ratios. This may be done by means of standard mixing units and is a technique familiar to those skilled in this art. In this connection, it is important to bear in mind that the fatty acid alkyl ester or polyol ester components are processed with the highly disperse, for example pyrogenic or pyrogenic hydrophobicized silicas, at room temperature or temperatures of up to at most 60° C. to form a uniform physical mixture. The optional lubricating additives may be incorporated in the physical mixture of silicas and fatty acid alkyl esters or polyol esters or mixtures thereof either at the same time or in a following operation.

The resulting products are used in the form of a fine, freeflowing powder which is therefore easy to dose at any temperature. The powder form alone represents a major advantage of the additives of the invention over the additives hitherto used for this purpose because no problems are involved in dosing the additive or incorporating it in the drilling fluids. This provides for easy handling in the desired temperature range of −40° to +80° C. by simple dosing and ready incorporation in the drilling fluids.

The powder-form additives of the invention can be used in drilling fluids for oil and mine drilling in quantities of from 0.01 to 5% by weight, based on the total weight of the drilling fluid. They can be used with particular advantage in oil well drilling fluids. The drilling fluid additives are preferably used in quantities of from 0.1 to 2% by weight, based on the total weight of the drilling fluid. In these quantities, the powder-form lubricant additives of the invention for water-based drilling fluids ensure that the rheological properties of the predominantly aqueous drilling fluids do not change so that rock cuttings may be removed at least equally effectively, if not more effectively. In addition, the additives guarantee improved lubrication of the drill pipe and drill bit in relation to additive-free drilling fluids due to the fact that they form a film with good lubricating properties on the metal parts. In addition, the natural ingredients of the powder-form additives according to the invention provide for full biological degradability. Accordingly, the powder-form additives of the invention for water-based drilling fluids can be used with advantage over the entire onshore and offshore range.

The invention is illustrated but not limited by the following Examples.

The quality of the lubricating properties of various drilling fluids containing the powder-form lubricant additives of the invention was tested on a so-called "Reichert friction wear balance". In this friction tester, a fixedly mounted test roller is pressed by a double-lever system onto a rotating abrasion ring of which the lower third is immersed in the liquid to be tested for its lubricating properties. When the abrasion ring rotates, worn areas, i.e. elliptical wear marks, are formed on the test roller, their size depending upon the lubricating power of the tested liquid. The lubricating power is greater, the smaller the elliptical wear mark after a certain running time (or rather distance travelled by the abrasion ring, 100 m of the peripheral travel of the abrasion ring.)

The following test conditions were established for the tester:

| | |
|---|---|
| Quantity of liquid: | 35 ml; |
| Test elements: | ring and roller, crossed axes; |
| Sliding speed: | 1.7 m/sec.; |
| Test duration: | 100 m travel (approx. 1 min.); |
| Test material: | tempered steel; |
| Normal load: | for an applied load of 1500 p at rest 15000 kp/cm$^2$ (Hertz compression); |
| Friction type: | sliding friction. |

COMPARISON EXAMPLES 1 to 5

Using the Reichert friction wear balance, the worn area on the test roller was determined under the conditions indicated above, the following test liquids being used:

Comparison Example 1: tapwater (16° Gh=German hardness);

Comparison Example 2: the particular drilling fluid without the additive of the invention, Comparison Example 3: the particular drilling fluid with pyrogenic silica only, Comparison Example 4: the particular drilling fluid with tall oil fatty acid only (liquid additive from the prior art) and Comparison Example 5: the particular test medium with only a distillation residue from the transesterification of native fatty acid esters.

To determine the lubricating properties, the elliptical worn area on the test roller (in mm$^2$) and the temperature of the test fluid after the test (in °C.) were measured.

A quantity of 1% by weight of the particular component was added in each of Comparison Examples 3, 4 and 5.

The results are shown in Table 1 below.

TABLE 1

Test results with the Reichert friction wear balance, Comparison Example 1 to 5.

| Comp. Ex. | Test medium | Additive | Worn area (mm$^2$) | Temp. after test (°C.) |
|---|---|---|---|---|
| 1 | water | — | 32.0 | 45–49 |
| 2a | tapwater + bentonite | — | 21.5 | 40–43 |
| 2b | KCl drilling fluid | — | 9.1 | 38–42 |
| 2c | salt water drilling fluid | — | 5.4 | 43–44 |

TABLE 1-continued

Test results with the Reichert friction wear balance, Comparison Example 1 to 5.

| Comp. Ex. | Test medium | Additive | Worn area (mm²) | Temp. after test (°C.) |
|---|---|---|---|---|
| 3a | tapwater + bentonite | silica K320 | 21.0 | 44–46 |
| 3b | KCl drilling fluid | silica K320 | 6.1 | 35–36 |
| 3c | Salt water drilling fluid | silica K320 | 4.2 | 29–34 |
| 4a | tapwater + bentonite | tall oil fatty acid | 1.9 | approx. 25[1] |
| 4b | KCl drilling fluid | tall oil fatty acid | 5.4 | 23–28[1] |
| 4c | salt water drilling fluid | tall oil fatty acid | 3.9 | 28–33[1] |
| 5a | tapwater + bentonite | fatty acid ester residue | 1.5 | approx. 23[2] |
| 5b | KCl drilling fluid | fatty acid ester residue | 5.0 | 25–28[2] |
| 5c | salt water drilling fluid | fatty acid ester residue | 2.0 | 24[2] |

Note:
[1] foams excessively.
[2] The mixture solidifies at lower temperatures; pour point: ca. +10° C.

In the following Examples according to the invention, the following additives were added to the particular test media or rather drilling fluids:

A: silica K320+isobutyl oleate
B: silica K320+isobutyl oleate+fatty acid methyl ester residue
C: silica K320+coconut oil fatty acid methyl ester+fatty acid methyl ester residue
D: silica K320+fatty acid methyl ester residue
E: silica K320+fatty acid methyl ester residue+calcium stearate
F: silica K320+fatty acid methyl ester residue+sulfurized tall oil fatty acid
G: silica K320+polyol ester from pentaerythritol and coconut oil fatty acid In the following Examples, additives (A) to (G) were each added to total quantities of 1% by weight, based on the drilling fluid as a whole.

EXAMPLE 1

The lubricating properties of additives (A) to (G) were tested using the Reichert friction wear balance in tapwater+bentonite as the test medium/drilling fluid. The results (worn areas and temperature of the test medium after the test) are shown in Table 2 below.

Test results with the Reichert friction wear balance, Example 1: tapwater/bentonite drilling fluid

TABLE 2

| Additive | Worn area (mm²) | Temperature after test (°C.) |
|---|---|---|
| A | 1.8 | approx. 26 |
| B | 1.5 | approx. 24 |
| C | 1.2 | approx. 23 |
| D | 1.3 | approx. 22 |
| E | 1.6 | approx. 25 |
| F | 1.2 | approx. 23 |
| G | 1.4 | approx. 22 |

Result:
As a comparison of the results of the present Example with the result of Comparison Examples 1 to 5 shows, the additives according to the invention exhibit excellent lubricating properties which result in a much smaller worn area than in the Comparison Examples. In addition, the temperatures after the test caused by the heat of the sliding friction are distinctly lower than the temperatures of the additive-free test media of Comparison Examples 1 to 5.

EXAMPLE 2

Additives (A) to (G) were tested for their lubricating properties in a KCl drilling fluid as test medium/drilling fluid under the same conditions as in Example 1. The results are shown in Table 3 below.

TABLE 3

Test results with the Reichert friction wear balance, Example 2: KCl drilling fluid

| Additive | Worn area (mm²) | Temperature after test (°C.) |
|---|---|---|
| A | 5.4 | 26–29 |
| B | 5.3 | 26–28 |
| C | 5.1 | approx. 26 |
| D | 5.3 | 26–28 |
| E | 5.3 | approx. 27 |
| F | 5.0 | approx. 26 |
| G | 5.3 | approx. 27 |

Result:
The additives according to the invention also show a distinct reduction in friction in a KCl drilling fluid through improved lubricating properties in relation to additive-free drilling fluids. The temperature of the test media after the test are distinctly lower than in the additive-free drilling fluids.

EXAMPLE 3

Additives (A) to (G) were tested for their lubricating properties in a salt water drilling fluid by the same method as in Examples 1 and 2. The test results are shown in Table 4 below.

TABLE 4

Test results with the Reichert friction wear balance, Example 3: salt water drilling fluid.

| Additive | Worn area (mm²) | Temperature after test (°C.) |
|---|---|---|
| A | 2.3 | 25 |
| B | 2.2 | 25 |
| C | 2.2 | 25 |
| D | 2.3 | 27 |
| E | 2.4 | 28 |
| F | 1.9 | 24 |
| G | 2.2 | 25 |

Result:
The lubricating properties of a salt water drilling fluid containing the powder-form additives according to the invention are considerably better than those of the additive-free drilling fluid.

It is also clear from all three Examples that the additives according to the invention show distinctly improved lubricating properties in the Reichert test (friction wear balance) in relation to silica alone (Comparison Example 3), tall oil fatty acid as prior art additive (Comparison Example 4[1]) and a distillation residue from the transesterification of native fatty acid as sole additive (Comparison Example 5[2]).

(1) Foams excessively
(2) The mixture solidifies at lower temperatures; pour point: ca. +10° C.

EXAMPLE 4

Another very effective test of the lubricating properties may be carried out using a so-called lubricity tester which enables the friction of the borehole cores against a rotating metal plate to be measured, the friction surface being flushed by drilling fluid and the borehole cores being pressed against the metal plate under different pressures. For a constant drive of the metal plate, the lubricating effect is reflected in the torque applied to the deflectably mounted core samples. If the lubricating effect is good, the torque measured is low; if the lubricating effect is poor, the measured torque value is very high. The following Table shows the so-called "friction coefficient $\mu$" which is related to the torque by the following equation:

$$\mu = \frac{M}{h \cdot F}$$

$\mu$ is the friction coefficient,
M is the torque,
h is the length of the lever arm and
F is the pressure applied.

Using the lubricity tester described above, the following lubricants, some of which contained certain lubricant additives, were tested in a bentonite-water drilling fluid, the drilling fluids containing per liter tapwater (16° Gh) 40 g bentonite and—where the addition of the lubricant was envisaged—from 5 to 10 g of a lubricant (exact concentration data below); I to III are comparison examples, IV to VII are examples in accordance with the invention:

I: no added lubricant
II: 10 g/l tall oil fatty acid
III: 10 g/l fatty acid methyl ester distillation residue
IV: 5 g/l silica K320+fatty acid methyl ester distillation residue
V: 5 g/l silica K320+fatty acid methyl ester distillation residue+calcium stearate
VI: 5 g/l silica K320+fatty acid methyl ester distillation residue+aluminium stearate
VII: 5 g/l silica K320+fatty acid methyl ester distillation residue+coconut oil fatty acid methyl ester.

The results of testing of the lubricating properties with the lubricity tester at different friction rates are shown in Table 5 below.

TABLE 5

| Lubricant Additive | Friction Coefficients $\mu$ at friction rates of | | | |
|---|---|---|---|---|
| | 0.5 m/sec. | 1.0 m/sec. | 2.0 m/sec. | 3.0 m/sec. |
| I | 0.35 | 0.15 | 0.10 | 0.06 |
| II | 0.15 | 0.10 | 0.07 | 0.05 |
| III | 0.09 | 0.05 | 0.03 | 0.025 |
| IV | 0.07 | 0.035 | 0.025 | 0.015 |
| V | 0.07 | 0.03 | 0.025 | 0.02 |
| VI | 0.05 | 0.025 | 0.015 | 0.01 |
| VII | 0.05 | 0.025 | 0.015 | 0.01 |

Testing of the lubricating properties with the lubricity tester:

Result:

As a comparison of the lubricating properties of the individual drilling fluids at different friction rates shows, the drilling fluids according to the invention containing silicas and ester components show a good to very good lubricating effect, as reflected in the low friction coefficient values which also correspond to low torques (for the same length of the lever arm and the same value of the pressure applied). The differences are most significant at low friction rates. In Comparison Examples II and III a concentration of 10 g/l was used. In contrast, the concentration of the lubricant in Examples IV to VII of the invention is only 5 g/l. This means that the actual differences between the comparison examples on one hand and the examples in accordance with the invention on the other hand are substantially larger than the figures in Table 5 show. In addition, it is to be noted that the test used in Example 4 is substantially more accurate and has higher predictive value than the test described in Examples 1 through 3. Specifically, in the test according to Example 4, a rock sample rubs against metal; this is substantially closer to actual practice than the test described in Examples 1 through 3, in which metal rubs against metal.

We claim:
1. A powder-form lubricant additive for water-based drilling fluids, consisting essentially of
    a. from about 95 to 30% by weight, based on the total weight of the powder, of a highly disperse silica having an average particle diameter of from about 5 to about 50 nm and a surface area of from about 50 to about 300 m²/g, and;
    b. from about 5 to about 70% by weight, based on the total weight of the powder, of one or more of
        i. fatty acid alkyl ester of the formula

        $$R^1COOR^2 \quad (I)$$

in which $R^1$ is a straight-chain or branched, saturated or mono- or polyunsaturated $C_9$–$C_{21}$ alkyl or alkenyl radical, and $R^2$ is a straight-chain or branched $C_1$–$C_{12}$ alkyl radical,
        ii. a polyol ester obtained by reaction of a di- or poly-hydroxy compound with a carboxylic acid of the formula

        $$RCOOH \quad (II)$$

in which R is a straight-chain or branched, saturated or mono- or polyunsaturated $C_5$–$C_{21}$ alkyl or alkenyl radical, and
        iii. a distillation residue from the transesterification of natural fatty acid esters.
2. The powder-form additive of claim 1 wherein component (a) is present in from about 60 to about 40% by weight.
3. The powder-form additive of claim 2 wherein component (b) is present in from about 40 to about 60% by weight.
4. The powder-form additive of claim 1 wherein up to 20% of one or more of a metal soap, a sulfurized fatty acid, and a blown oil is also present.
5. The powder-form additive of claim 4 wherein a metal soap is present and is aluminum stearate, calcium stearate or magnesium stearate.
6. The powder-form additive of claim 1 wherein in component (b)(i) the $R^1$ group contains from 11 to 17 carbon atoms.
7. The powder-form additive of claim 1 wherein component (b)(i) is a mixture of fatty acid alkyl esters from naturally occurring fatty acids.
8. The powder-form additive of claim 7 wherein the mixture of fatty and alkyl esters are obtained from cocosalkyl or tallow alkyl fatty acids.
9. The powder-form additive of claim 1 wherein in component (b)(i) the $R^2$ group contains from 1 to 8 carbon atoms.
10. The powder-form additive of claim 1 wherein the $R^2$ group is methyl, ethyl, n-propyl or i-propyl.
11. The powder-form additive of claim 1 wherein component (b)(ii) is one or more of a polyol ester obtained by the reaction of ethylene glycol, propylene glycol, glycerol, trimethylolethane, trimethylolpropane, pentaerythritol, sorbitol, polyols obtained by autocondensation of glycerol with elimination of water, or a reaction product of the above compounds with ethylene oxide and/or propylene oxide, with a carboxylic acid of the formula $$RCOOH \qquad (II)$$

in which R is a straight-chain or branched, saturated or mono- or polyunsaturated $C_5$–$C_{21}$ alkyl or alkenyl radical.

12. In water-based drilling fluid, the improvement comprising the presence therein of from about 0.01 to about 5% by weight, based on the total weight of drilling fluid, of the powder-form additive of claim 1.

13. The water-based drilling fluid of claim 12 in which the powder-form additive is present in from about 0.1 to about 2% by weight.

* * * * *